United States Patent Office 3,505,812
Patented Apr. 14, 1970

3,505,812
FUEL SYSTEM FOR A GAS TURBINE POWER PLANT
Robin Michael Dakin, West Hartford, Conn., and Richard Henry Moss, Coventry, England, assignors to Rolls-Royce Limited, Derby, England, a British company
Filed July 29, 1968, Ser. No. 748,476
Claims priority, application Great Britain, Aug. 10, 1967, 36,752/67
Int. Cl. F02c 3/10, 9/04
U.S. Cl. 60—39.16
2 Claims

ABSTRACT OF THE DISCLOSURE

A gas turbine fuel system including a restricter connected to a pressurised fluid supply, a valve member controlling flow through said restrictor, first pressure-responsive means connected to receive a fluid pressure signal variable in accordance with turbine speed, means for producing a time delay in response to said fluid pressure signal, second pressure-responsive means connected to receive the same fluid pressure signal as said first pressure-responsive means but via said time delay means, third pressure-responsive means connected to said pressurised fluid supply downstream of said restrictor and means for transmitting the fluid pressure applied to said third pressure-responsive means as an output signal to operate a fuel control valve.

---

The invention relates to a fuel system for a gas turbine power plant and is particularly concerned with a fuel system for a gas turbine power plant having an independent power turbine arranged to drive a variable load. The latter may be, for example, an electrical generator, a pump, a compressor or a propellor.

When the load on the power turbine changes, the speed of the power turbine will be affected. In a known fuel system, a signal dependent upon power turbine speed is employed to operate a control valve for supplying fuel to a burner of a combustion chamber of the plant, whereby, on change of power turbine speed, the fuel supply will be altered to bring the power turbine speed to a datum value.

An object of the invention is to provide in a fuel system in which a fuel control valve is operated in response to change of power turbine speed, means for applying to the control valve a derivative control term, i.e., one responsive to rate of change of power turbine speed, whereby the effect of transient changes of power turbine speed due to rapid changes of load is reduced.

According to the invention, a fuel system, for a gas turbine power plant having an independent power turbine arranged to drive a variable load, includes a restrictor connected to a pressurised fluid supply, a valve member arranged to control the flow of said fluid through said restrictor and thereby the pressure of said fluid downstream of said restrictor, first pressure-responsive means connected to receive a fluid pressure signal variable in accordance with change of power turbine speed, means for producing a time delay in response to said fluid pressure signal, second pressure-responsive means connected to receive the same fluid pressure signal as said first pressure-responsive means via said time delay means, whereby said second pressure-responsive means will counteract partially the effect of said first pressure-responsive means only after said time delay, third pressure-responsive means connected to said pressurised fluid supply downstream of said restrictor and means for transmitting the fluid pressure applied to said third pressure-responsive means as an output signal to operate a control valve for supplying fuel to a burner of a combustion chamber of the gas turbine power plant.

As will be explained hereinafter, with the fuel system as set out in the immediately preceding paragraph, the output signal will only reach a steady value after said time delay and therefore the fuel control valve will only become readjusted to a new datum after said time delay.

By way of example, a fuel system in accordance with the invention, for a gas turbine power plant having an independent power turbine arranged to drive a variable load, is now described with reference to the accompanying drawings, in which.

Figure 1:
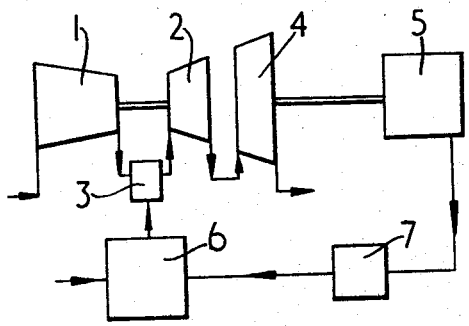
FIGURE 1 is a block diagram showing the power plant and the fuel system.

Referring firstly to FIGURE 1, the gas turbine power plant is shown diagrammatically and comprises basically a compressor 1 driven by a gas turbine 2, receiving hot gas from a combustion chamber 3 supplied with air by the compressor 1. The exhaust from the turbine 2 is expanded through an independent power turbine 4 which is drivingly connected to the load 5. The latter may, for example, be an electrical generator, a pump, a compressor or a propellor.

The combustion chamber is supplied with fuel, either liquid or gaseous or any mixture thereof, under the control of a fuel control unit 6, which includes a fuel control valve and may also include any known governor devices. In accordance with this invention, an input signal, derived from the load and a function of the speed of the power turbine 4, is applied via a proportional and derivative control unit 7, resulting in an output signal, as will hereinafter be explained, to the fuel control unit 6 by which the fuel control valve is operated to control the supply of fuel to the combustion chamber 3.

Figure 2:
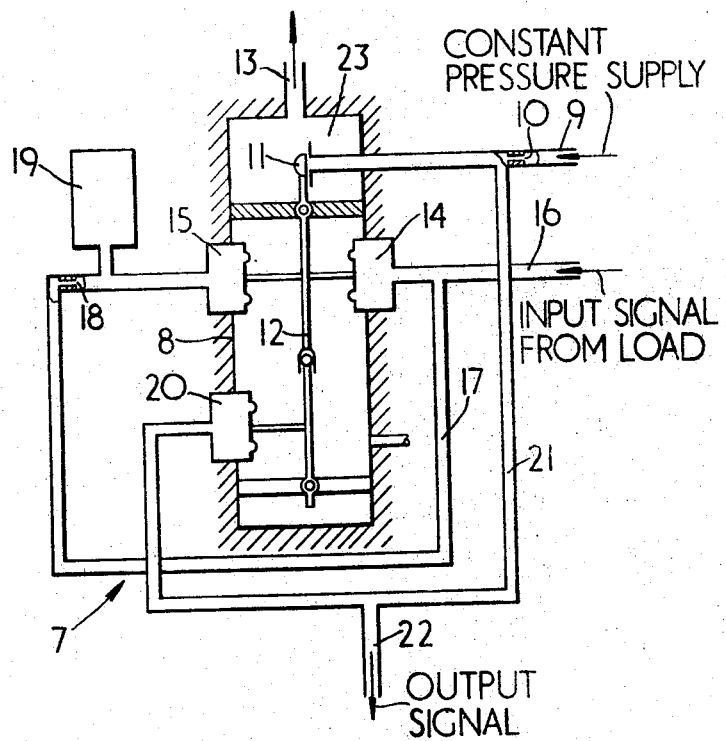
FIGURE 2 is a diagram showing the part of the fuel system with which this invention is concerned, and FIGURE 3 are graphs showing how the pressure of the aforesaid output signal will reach a steady value only after a time delay following the receipt of an input signal resulting from a sudden change of power turbine speed.

The derivative control unit 7 is shown in more detail in FIGURE 2 and comprises a block 8 having a compartment 23 communicating with a supply pipe 9 to which a control fluid, e.g., oil, is supplied at constant pressure. The supply pipe 9 includes a fixed restrictor 10 and has an outlet to the compartment 23 controlled by a half-ball valve 11 carried on a pivotally-mounted arm 12. The latter may be a simple lever or a composite arm, as indicated, of the kind claimed and described in U.S. patent specification No. 3,176,540. The compartment 23 in the block 8 leads through a pipe 13 to the spill return of a pump (not shown) supplying the pipe 9.

The arm 12 is engaged by a pair of opposed pressure-responsive devices 14, 15, e.g. diaphragms, forming respectively said first and second pressure-responsive means. The device 14 is responsive to an input signal applied through pipe 16. The input signal is produced by a speed signal generator driven by the load 5 and is a function of the power turbine speed. The input signal is also applied through a branch pipe 17 and a fixed restrictor 18 to the device 15. The portion of the branch pipe between the restrictor 18 and the device 15 includes a dash-pot 19. Instead of the dash-pot 19, the pressure downstream of the restrictor 18 may be applied to the device 15 through a resilient bellows or equivalent means. The function of the restrictor 18 and the dash-pot 19 is to provide a time delay in the response of the device 15 to a change in the input signal applied through pipe 16.

The arm 12 is also engaged by a pressure-responsive device 20, such as a diaphragm, forming the aforesaid third pressure-responsive means. The device 20 is connected to the supply pipe 9 by a branch pipe 21, communicating with the pipe 9 downstream of the restrictor 10. A branch 22 from the pipe 21 leads to the fuel control unit 6, shown in FIGURE 1, to convey an output signal thereto to operate the fuel control valve.

Figure 3:
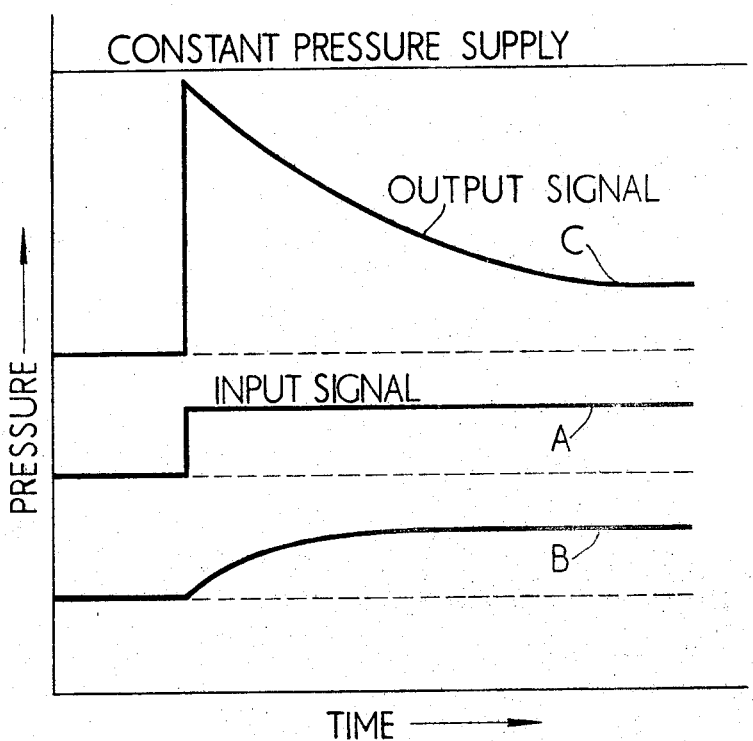

The operation of the unit 7 is now described with reference to FIGURE 3. The latter comprises three graphs A, B and C of pressure plotted against time. When a sudden change, e.g. an increase, of power turbine speed occurs due to a rapid decrease of load, a stepped input signal represented by graph A is supplied through the pipe 16. A pressure drop is produced by the restrictor 18 and as a result of this pressure drop together with the effect of the dash-pot 19, the increase in pressure on the device 14, due to the input signal, is not immediately applied to the device 15. The pressure applied to the device 15 will instead rise gradually as indicated by the curved part of graph B until after a time delay, the pressure applied to the device 15 has become substantially equal to that applied to the device 14. As soon as the stepped signal is applied to the pipe 16 and before the end of said time delay, the device 14 causes the arm 12 to pivot to move the half-ball valve 11 towards the outlet of the supply pipe 9. This will effect a change in pressure acting on the device 20 and so the output pressure available at pipe 22 will rise suddenly, as shown by the stepped portion of graph C, to almost the supply pressure. However, as the pressure applied to the device 15 rises gradually, as shown by graph B, the output signal pressure will fall gradually, as shown by graph C, to a datum value. After the time delay the arm 12 will return to an equilibrium position and the pressures applied to the devices 14, 15 and 20 will become substantially equal as shown by the graphs A, B and C. Due to the restrictor 18 and the dash-pot 19, the steady output signal available at pipe 22 will be produced only after the time delay and so the unit 7 reduces the effect of transient changes of power turbine speed due to rapid changes of load.

What we claim as our invention and desire to secure by Letters Patent of the United States is:

1. A fuel system, for a gas turbine power plant having an independent power turbine arranged to drive a variable load, including a control valve for supplying fuel to a burner of a combustion chamber of the gas turbine power plant, a restrictor connected to a pressurised fluid supply and a valve member arranged to control the flow of said fluid through said restrictor and thereby the pressure of said fluid downstream of said restrictor, wherein the improvement comprises first pressure-responsive means connected to receive a fluid pressure signal variable in accordance with change of power turbine speed, means for producing a time delay in response to said fluid pressure signal, second pressure-responsive means connected to receive the same fluid pressure signal as said first pressure-responsive means via said time delay means, whereby said second pressure-responsive means will counteract partially the effect of said first pressure-responsive means only after said time delay, third pressure-responsive means connected to said pressurised fluid supply downstream of said restrictor and means for transmitting the fluid pressure applied to said third pressure-responsive means as an output signal to operate said fuel control valve.

2. A fuel system as claimed in claim 1 in which said time delay means comprises a second restrictor positioned upstream of said second pressure-responsive means and a dash-pot device connected between said second restrictor and said second pressure-responsive means.

References Cited

UNITED STATES PATENTS

| 3,243,596 | 3/1966 | Loft | 60—39.16 XR |
| 3,255,586 | 6/1966 | Hennig et al. | 60—39.17 XR |

CARLTON R. CROYLE, Primary Examiner

U.S. Cl. X.R.

137—22, 36